Dec. 27, 1932.     N. E. BARNES     1,892,230
PLOW
Filed Nov. 19, 1931
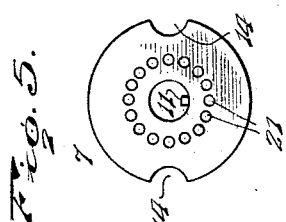
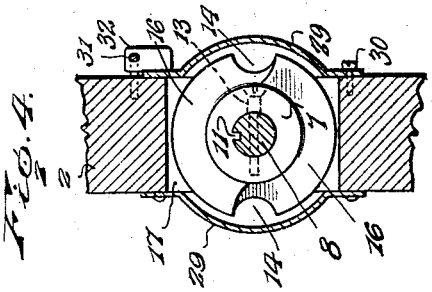
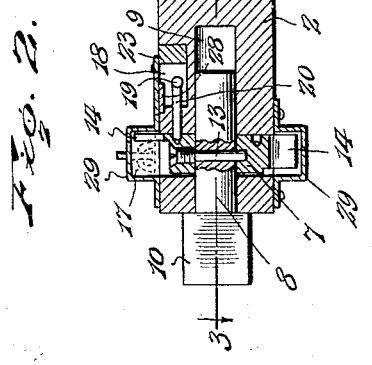
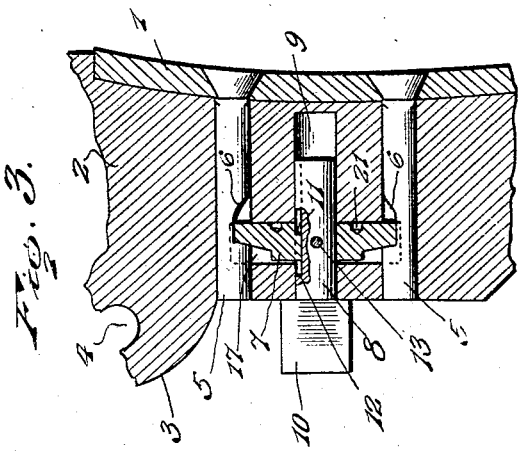
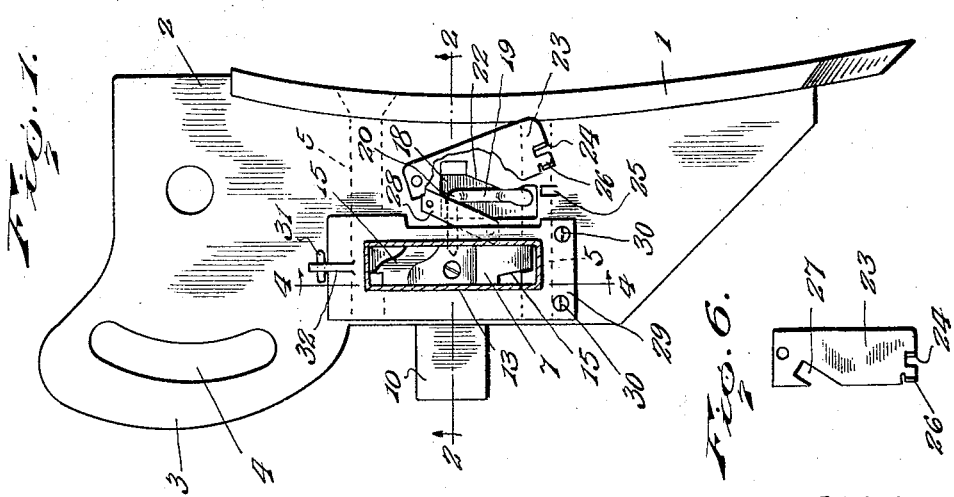
INVENTOR
N. E. Barnes.
By Lacey & Lacey,
Attys Patented Dec. 27, 1932

1,892,230

UNITED STATES PATENT OFFICE

NOAH ETCYL BARNES, OF SMALLETT, MISSOURI

PLOW

Application filed November 19, 1931. Serial No. 576,151.

This invention relates to agricultural implements and more particularly to the means for securing a plow or cultivator blade or shovel to its supporting shank or standard, the object of the invention being to provide an efficient novel fastening which may be easily set to secure the shovel and which will dispense with the necessity for skilled labor or the use of wrenches or other tools. One embodiment of the invention is illustrated in the accompanying drawing and the invention resides in certain novel features which will be hereinafter first fully described and then more particularly defined in the appended claims.

In the drawing,

Figure 1 is a side elevation, partly broken away and in section, of a plow-blade or shovel secured in place by my improved fastening means, Fig. 2 is a section on the line 2—2 of Fig. 1, Fig. 3 is a vertical longitudinal section, the plane of the section being indicated by the line 3—3 of Fig. 2, Fig. 4 is a section on the line 4—4 of Fig. 1, Fig. 5 is a detail elevation of the front side of the cam locking disk, Fig. 6 is a detail of a cover which is provided over a locking pin.

The blade or shovel 1 is of the usual form and is ordinarily secured to the lower end of a supporting standard or shank or to a foot which is pivotally attached to the lower end of such supporting shank or standard and, in the drawing, the shovel is shown as secured to a foot 2, this foot being adapted to be pivoted at its upper end to the lower end of a plow or cultivator shank or standard and provided with extensions 3 having arcuate slots 4 therein whereby to accommodate a fragile pin carried by the supporting standard or shank so that normally the plow-blade or share will be held to its work but upon striking an immovable obstruction, such as a large rock, will be permitted to yield to the obstruction and ride over the same without being damaged thereby. Ordinarily, threaded bolts having dove tailed or flared heads are inserted through the share or shovel, and the lower end of its support, and equipped with nuts turned home against the support to hold the share. This arrangement is obviously objectionable inasmuch as a wrench is necessary to turn the nuts home and it is frequently exceedingly difficult to remove the nuts when removal is necessary inasmuch as they become rusted to the bolts. In carrying out the present invention, the share or blade is provided with the flared openings, as usual, to receive the heads of securing bolts, but the bolts 5 are not threaded and are of such length that their rear ends are disposed flush with the rear side of the foot or support 2 when all the parts are in place. Each bolt is provided with a recess 6 adjacent its rear end whereby a transverse shoulder is formed and adapted to be engaged by the cam locking disk 7. The disk 7 is carried by a short shaft 8 which is rotatably mounted within a bore or socket 9 provided therefor in the support midway the openings which receive the bolts 5, as will be understood upon reference to Fig. 3. The shaft 8 is provided, at its rear end, with a handle 10 which may be of any approved form and may be conveniently grasped by the hand of the operator. The cam disk 7 is provided with a key, indicated at 11, adapted to fit within a keyway 12 formed in the side of the shaft 8, as shown, so that the turning movement of the shaft will be imparted to the disk, and, for further security, a pin or set screw 13 is provided which is inserted through the disk from its periphery and engaged through the shaft, as shown clearly in Fig. 2. The cam disk is provided with diametrically opposite notches 14, in its edge, and upon its rear face is constructed with cam surfaces 15 which engage the shoulders formed in the bolts so that, upon rotation of the disk, the bolts will be drawn rearwardly and the flared heads of the same caused to bind within the flared openings in the blade, and the blade will be firmly held to the support.

The cam disk is disposed within a transverse chamber 17 provided therefor in the support and its periphery projects through the opposite sides of said chamber, as shown in Figs. 2 and 4, and the bolt-receiving openings intersect the top and bottom of the chamber so that the disk may engage the shoulder on the bolts, as clearly shown in Fig. 3. In the side of the support, in advance of said chamber 17, is a recess 18, and disposed within said recess is the handle 19 of a locking pin 20 which is adapted to engage any one of the annular series of sockets 21 provided in the front face of the cam disk, thereby holding the cam disk against retrograde movement. The locking pin 20 is journaled in an opening provided therefor in the support between the recess 18 and the chamber 17, as shown in Fig. 2, and the forward wall of the recess 18 is disposed upon an incline, as shown at 22, whereby it will serve as a cam to effect longitudinal movement of the locking pin as a turning movement is imparted thereto through manipulation of the handle 19. A cover 23 is pivoted at its upper corner upon the side of the support in position to extend over the recess 18 and thereby retain the locking pin therein so as to prevent loss of the latter as well as to exclude all foreign matter. This cover is provided at its lower end with a tooth 24 adapted to engage a socket 25 provided therefor in the side of the support so that the cover will be held in its position over the recess and, at its lower end, the cover is also provided with an out-turned tongue 26 which may be utilized as a handle member to facilitate the swinging of the cover when necessary. Near its upper end, the cover plate 23 is provided with an obliquely disposed notch or open-ended slot 27 in its rear edge which, when the cover is in the position shown in Fig. 1, will have its lower wall disposed in alinement with the inclined wall 22 of the recess 18, the upper wall of the notch being thereby disposed parallel with said wall 22 so that, when the handle 19 is swung upwardly and outwardly, it will ride against the upper wall of the notch 27 and be thereby diverted laterally so that the pin 20 will be withdrawn from its engagement with the cam disk 7. In order that the recess may be fully covered and closed when the cover plate is disposed over the handle 19, a closing strip 28 is secured across the upper rear corner of the recess 18 in such position that, when the cover plate is in its closed position, the notch 27 therein will be entirely closed by said plate or strip 28. It will be understood that the cam surfaces on the disk will ride easily into engagement with the recesses in the bolts and the turning movement of the disk draws the bolts rearwardly. When the locking disk 7 has been turned so as to bring the securing bolts 5 into their rearmost positions, the handle 19 is turned downwardly and inwardly so as to be disposed within the recess 18 and this movement will cause it to ride upon the wall 22 and be thereby pushed rearwardly so that the pin 20 will be carried into engagement with one of the sockets 21 in the disk 7 and accidental turning of the disk with resulting release of the bolts will be prevented.

The projecting portions of the periphery of the disk 7 are covered by housing plates 29 secured upon the sides of the support over the sides of the chamber 17 whereby the periphery of the disk 7 will be entirely enclosed and will be protected against damage from possible flying stones or other objects. One of the plates 29 is secured permanently upon the side of the support 2 while the other plate is secured, at its lower end, by screws 30 and, at its upper end, is carried by a loop 31 secured in the side of the standard and engaged through a short rib 32 formed upon the plate so that, by withdrawing the screws 30, the plate will be loosened and may be swung upwardly upon the loop 31 thereby giving access to the pin or screw 13 to permit its withdrawal and consequent release of the cam disk from the shaft 11 so that any necessary repairs may be easily made.

From the foregoing description, taken in connection with the accompanying drawing, it will be seen that I have provided an exceedingly simple, compact mechanism whereby a plow-blade may be secured firmly to its support quickly and without the employment of skilled labor or the use of any special tools.

It should be understood that the particular means employed for effecting coupling to the shank or standard is immaterial, and the device of my invention may be used to secure the blade or shovel directly to the standard or shank of the plow or cultivator.

Having thus described the invention, I claim,

1. The combination with a plow-blade, and its support, the blade and the support having bolt-receiving openings and the support having a chamber disposed between and communicating with the bolt-receiving openings and being provided with a socket between and parallel with the bolt-receiving openings, bolts fitted in the bolt-receiving openings of the blade and support and binding the blade to the support and provided with recesses in their sides defining transverse shoulders, a cam disk mounted in the chamber in the support and having its cam face engaging the shoulders of the bolts and provided in its bore with a key, a turning shaft rotatably mounted in the socket in the support and provided with a longitudinal keyway whereby it may be slid into or out of engagement with the disk, and means for detachably connecting the disk to said turning shaft.

2. The combination with a plow-blade, and its support, the blade and the support being provided with bolt-receiving openings and the support being further provided with a transverse chamber between and communicating with the bolt-receiving openings and having a socket disposed between and parallel with said openings and being further provided in one side with a recess having communication with the chamber, bolts fitted in the bolt-receiving openings to bind the blade to the support and provided in their sides with recesses defining transverse shoulders, a cam disk mounted within the chamber in the support and having its cam face engaging the shoulders of the bolts, a turning shaft mounted in the socket in the support and detachably secured to the cam disk, a locking pin mounted in the recess in the side of the support to engage a face of the cam disk, and cam means on the support for imparting longitudinal movement to said locking pin as it is turned axially.

3. The combination with a plow-blade, and its support, the blade and support being provided with bolt-receiving openings and the support being provided in one side with a recess having a cam wall, bolts fitted in the openings in the blade and the support to bind the blade to the support and provided with transverse shoulders, a cam disk mounted in the support and engaging said transverse shoulders on the bolts, means for rotating said disk, a locking pin rotatably mounted in the recess in the side of the support and having a handle member adapted to ride on the cam wall of said recess, and a cover plate mounted on the side of the support to extend over said recess and provided in one edge with an obliquely disposed notch whereby, in the open position of the cover, the handle of the locking pin may ride in said notch to be given lateral movement as it is rocked to turn the locking pin.

In testimony whereof I affix my signature.

NOAH ETCYL BARNES. [L. S.]